Figure 1:
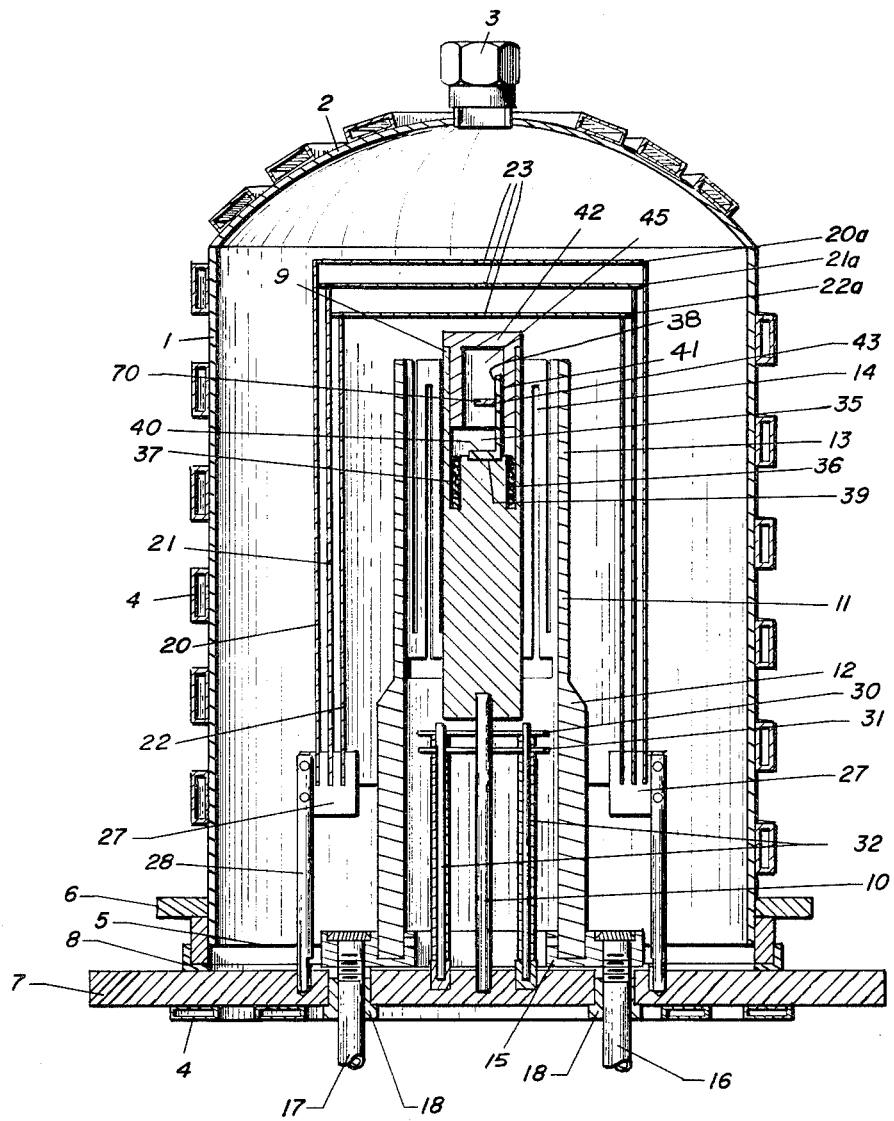

Jan. 11, 1966  K. M. HERGENROTHER  3,228,756
METHOD OF GROWING SINGLE CRYSTAL SILICON CARBIDE
Filed May 20, 1960

INVENTOR.
Karl M. Hergenrother
BY
Ezekiel Wolf, Wolf & Greenfield
his attorneys

United States Patent Office 3,228,756
Patented Jan. 11, 1966

3,228,756
METHOD OF GROWING SINGLE CRYSTAL SILICON CARBIDE
Karl M. Hergenrother, Burlington, Mass., assignor to Transitron Electronic Corporation, Wakefield, Mass., a corporation of Delaware
Filed May 20, 1960, Ser. No. 30,658
2 Claims. (Cl. 23—301)

The present invention relates to a method of growing epitaxial single silicon carbide crystals.

Silicon carbide may be grown from a vapor phase in several ways. It may be allowed to nucleate on a surface in a random manner, or alternately it can be condensed onto a seed of silicon carbide. Allowing silicon carbide to nucleate from a vapor phase on a surface in a random fashion is impractical because it takes a substantial period of time to grow a crystal of satisfactory size for commercial use. The second mentioned method, using a relatively large silicon carbide seed onto which additional silicon carbide is grown, is satisfactory if the layer grown onto the seed is an epitaxial single crystal layer. When depositing silicon carbide on a silicon carbide seed, it is necessary to grow only a thin layer of a silicon carbide crystal to make a useful crystal for electrical devices. There is a considerable problem, however, in growing such a single crystal film or layer on a seed, rather than a multitude of small crystals.

It has been found that if a silicon carbide seed is spaced from a charge of silicon carbide and is raised above the vaporizing point of the silicon carbide charge, to preferably above 2000° C., and the temperature of the charge is raised to a temperature in excess of the temperature of the seed, silicon carbide will grow on the seed. If the silicon carbide vapor is kept from the seed, while the seed is being heated to its desired temperature, there is little chance of polycrystals forming on the seed.

In the present invention, there is provided a furnace having a very low thermal inertia having an interior designed to support a silicon carbide seed and silicon carbide charge in selected relationship, whereby silicon vapors from the charge will deposit on the seed at a selected rate of growth without a likelihood of small crystals being formed. By raising the temperature of the seed quickly through the low temperature ranges in which small crystals are more likely to form, temperature levels can be reached which favor single crystal growth.

In the present invention, means are also provided for properly positioning the silicon carbide seed and charge with respect to one another and with respect to the temperature gradient in the furnace. Means are also provided for maintaining the silicon carbide vapor in the atmosphere in a supersaturated condition in the neighborhood of the seed once the seed has been raised to its selected temperature. Means are also provided for keeping the silicon carbide vapor in the atmosphere in the area of the seed from reaching a supersaturated condition while the seed is being heated through the temperature range where small crystal nucleation is likely to occur. The structure contemplated also provides means for maintaining the atmosphere about the seed supersaturated with silicon carbide vapors after the seed has been heated through the critical temperature range.

These and other objects and advantages of the present invention will be more clearly understood when considered in conjunction with the accompanying drawings in which:

FIG. 1 is a cross sectional elevation of the furnace of the present invention.

Silicon carbide vaporizes in measurable quantities at about 1800° C. Actually silicon carbide will vaporize in very minute unmeasurable quantities below 1800° C. However, the amount that will vaporize at these lower temperatures is substantially negligible. There is, however, a critical temperature range of between approximately 1800° C. and 2000° C. or perhaps as much as 1800° C. to 2100° C. which is a critical range in which silicon carbide vapors will condense onto a silicon carbide seed depositing a polycrystalline layer. Such a layer is not suitable for most electrical device application work. Accurate and specific temperatures at which such polycrystalline layers form are quite difficult to determine because of the nature of the construction of the furnace disclosed herein and the methods used in growing silicon carbide. The temperatures referred to in this specification are determined by measuring the temperatures of various components of a furnace since the actual temperature of the silicon carbide charge and seed cannot readily be determined. It has been found that if a silicon carbide seed is spaced from a silicon carbide charge, and the seed is heated quickly through the critical temperature range of substantially 1800° C. to 2000° C. or 2100° C. before the atmosphere about the seed becomes supersaturated with silicon carbide vapors, the silicon carbide will deposit on the seed in an epitaxial single crystal layer when the supersaturated vapor is exposed to the seed.

This layer of silicon carbide epitaxial single crystal may, if desired, be formed of several differently doped layers of P type, N type or intrinsic silicon carbide.

The silicon carbide seed is heated preferably to at least 2000° C. The temperature of the charge is somewhat higher. If the seed is maintained at about 2000° C. the temperature of the charge should be no more than approximately 2100° C. At higher temperatures of the silicon carbide seed, there may be greater differences in the temperature of the charge. Thus, for example, where the seed is maintained at 2500° C. the charge may be maintained 2700° C. The lower the temperature of the seed, the closer the temperature of the charge must be or otherwise the supersaturated silicon carbide vapor will condense on the seed too quickly, and thereby result in a polycrystalline structure.

In FIG. 1 there is illustrated a cross sectional view of a preferred embodiment of a furnace useful in growing epitaxial single crystal silicon carbide. In the arrangement illustrated, a water cooled container is provided with a continuous domed cover 2 having a viewing port 3 at its uppermost point. The container is encircled by a continuous series of cooling coils 4 which may be made of copper or the like and through which water or other cooling fluid is adapted to flow. The lower edge 5 of the container has a frame 6 having an inverted L-shaped cross section. This frame supports the can on the metallic base 7 with an interposed gasket of suitable material 8 adapted to effect a suitable gas seal. Supported within the can is a graphite chamber generally illustrated at 9. This graphite chamber comprises a cylindrical shaped member supported on an elongated graphite rod 10 secured at its lower end in the base 7 and at its upper end in the base of the graphite chamber 9. A graphite heater 11 surrounds the graphite chamber 9. This heater, which may be of conventional size and shape includes two semi-cylindrical lower portions 12 and an upper portion 13 comprising a cylindrical shell. This shell 13 forms a continuation of the lower portions 12. The shell 13 is provided with a series of slots extending alternately upwardly and downwardly from their upper and lower edges respectively as illustrated at 14, forming a tortuous path for the passage of current therethrough. The lower portions 12 are supported in a split annular ring 15 at its lower edge. This annular ring in turn is spaced from the base 7 and is connected to suitable electrical outlets through the electrodes 16 and 17. The electrodes 16 and 17 are insulated from the base 7 by insulators 18.

The graphite growing chamber 9 is heat shielded by a plurality of cylindrical molybdenum shields 20, 21 and 22 preferably coaxial with the chamber 9 and concentric with one another. A plurality of molybdenum covers 20a, 21a, 22a cover the tops respectively of the shields 20, 21 and 22. Each of the covers may be provided with a peep hole 23 for viewing through the viewport 3. The shields 20, 21 and 22 are supported at their lower edge by several preferably three, support means. These support means include a flat plate 27 having grooves for each of the shields 20, 21 and 22 with a plate 27 in turn secured to a rod 28. The rod 28 is supported at its lower end in the base 7. The support means may be made of a suitable heat resistant material such as molybdenum. The lower portion of the growing chamber is shielded by a plurality of base shields 30 and 31 positioned respectively one above the other end and secured just below the bottom of the graphite growing chamber 9 by means of several, preferably 3 support rods which, if desired, may be comprised of molybdenum rods.

The growing chamber 9 is preferably cylindrical in shape and has a cylindrical recess 35 extending downwardly from its upper end. An annular slot 36 extends downwardly from the bottom of the recess 35 with the outer wall of the slot 36 continuous with the wall of the recess 35. The slot 36 is adapted to contain a silicon carbide charge as illustrated at 37. A seed holder 38 of graphite is supported on the bottom of the recess 35 in a depression 39 shaped to receive the holder 38. The holder 38 is formed preferably of a cylindrical section of graphite with the cylindrical section cut away to provide an L-shaped cross sectioned support or holder 38. The cylindrical base 40 of the holder fits into the depression 39 while the upstanding leg 41 of the holder fits closely against the cover 42. A slot 43 formed in the leg 41 receives a silicon carbide seed 70 in spaced relation to the silicon carbide charge 37. The cover 42 preferably made of graphite fits closely against the wall of the recess 35 and is provided with a recess 45 in its bottom adapted to receive the upper portion of the seed holder 38 and the silicon carbide seed 70.

In the operation of the furnace described, the silicon carbide seed 70 and the silicon carbide charge 37 are heated until the silicon carbide seed reaches a temperature of approximately at least 2100° and the silicon carbide charge reaches a temperature of approximately 2200°. The construction of the furnace is such that the silicon carbide seed will have a temperature less than the silicon carbide charge. The seed is spaced sufficiently from the charge so that during the heating of the seed to a temperature of at least substantially 2100°, substantially no vapors from the charge will reach the seed. In one actual model constructed as illustrated, the space was 1". At 2100°, however, the environment of the silicon carbide seed becomes supersaturated with silicon carbide vapor which because of the temperature differential, will deposit on the seed, thereby causing the seed to grow. The seed will grow with a layer of epitaxial single crystal silicon carbide, since the temperature is raised sufficiently quickly in an atmosphere unsaturated with silicon vapors to permit the subsequent deposit of the silicon carbide vapors in single crystal form rather than in polycrystal form on the seed. As previously stated, the temperature can be varied provided the silicon carbide seed is raised quickly through the critcial range to a temperature of substantially 2100° or more and the temperature of the silicon carbide charge exceeds that of the seed. Even though the charge may be heated more rapidly than the seed, the seed is heated quickly enough and is far enough from the charge so that by the time the silicon carbide vapor from the charge reaches supersaturation in the vicinity of the seed, the seed is hot enough so that single crystal growth is initiated.

What is claimed is:

1. A method of growing an epitaxial single crystal silicon carbide layer onto a silicon carbide seed comprising spacing said seed and a charge of silicon carbide, heating said seed and charge to a temperature of at least substantially 2000° C. with the temperature of the charge in excess by at least substantially 50° C. of the temperature of the seed while maintaining the concentration of silicon carbide vapors in the environment of said seed below supersaturation until said temperatures are reached, by heating the seed quickly through the critical range of substantially 1800° C. to 2000° C. to avoid measurable vaporization of the seed and after said temperatures are reached, raising the concentration of silicon carbide vapors produced by said charge in the vicinity of said seed to above supersaturation to form an epitaxial single crystal silicon carbide layer.

2. A method of growing an epitaxial single crystal silicon carbide layer from a charge of silicon carbide onto a silicon carbide seed comprising simultaneously heating said charge and seed to substantially at least 2000° C. with the temperature of said charge at least 50° C. greater than said seed, and spacing said seed from said charge a distance such that silicon carbide vapors from said charge will create a supersaturated atmosphere about said seed but only after said seed has reached a temperature of substantially 2000° C., by heating the seed quickly through the critical range of substantially 1800° C. to 2000° C. to avoid measurable vaporization of the seed and after said temperatures are reached, raising the concentration of silicon carbide vapors produced by said charge in the vicinity of said seed to above supersaturation to form an epitaxial single crystal silicon carbide layer.

References Cited by the Examiner

UNITED STATES PATENTS

| | | | |
|---|---|---|---|
| 2,754,259 | 7/1956 | Robinson et al. | 23—294 X |
| 2,890,939 | 6/1959 | Ravich | 23—294 |
| 2,929,691 | 3/1960 | Decroly. | |
| 2,947,613 | 8/1960 | Reynolds | 23—294 |
| 2,996,783 | 8/1961 | Mayer | 23—294 X |

OTHER REFERENCES

Lawson, et al.: "The Preparation of Single Crystals," pages 21 to 23 (1958).

Butterworth Publications, Qd 931 L3 1958a c.2 (Copy in the Scientific Library).

Epitaxial and Single Crystal Growth on to Silicon Carbide, Boston Seeds, by Hergenroth, et al.

Silicon Carbide, a High Temperature Semiconductor.

Proceedings of the Conference on Silicon Carbide, Boston, Mass., April 2–3, 1959.

NORMAN YUDKOFF, Primary Examiner.

ANTHONY SCIMANNA, MAURICE BRINDISI, Examiners.